Dec. 3, 1963 — H. G. COOK — 3,112,615
ELECTRICAL CONNECTOR FOR BOOST SUSTAINED ROCKET MOTOR
Filed May 29, 1962

INVENTOR.
HAROLD G. COOK
BY
ATTORNEY.

3,112,615
ELECTRICAL CONNECTOR FOR BOOST SUSTAINED ROCKET MOTOR
Harold G. Cook, China Lake, Calif., assignor to the United States of America as represented by the Secretary of the Navy
Filed May 29, 1962, Ser. No. 198,651
7 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to rockets and more particularly to improvements in contact apparatus for connecting certain of their electrical circuits.

In certain types of rockets it is conventional practice to provide tandem propulsion motors which contain solid propellants, the rearward motor providing initial or first stage thrust and the forward motor providing sustaining thrust after burn-out of the first stage motor. Suitable electrical control apparatus is provided forwardly of the sustainer motor which energizes the igniter circuits, or controls other circuits, in proper timed relationship and it is essential that certain connecting or lead wires extend between the control apparatus and components, such as igniters, disposed in both motors. In order to assemble the various parts of the rocket it has been found expedient to secure the control apparatus to the sustainer motor by a threaded coupling which thus requires relative rotary motion between it and rearwardly previously assembled stationary parts. The prior practice employed was to extend the various electrical leads through axial apertures in the motor components and suitably connect their forward ends to terminals on the control apparatus. After so connecting, the control apparatus was then threaded onto the forward motor to its final position of assembly. Its rotary motion of assembly then caused the various electrical leads to be twisted. The twisting of these leads is undesirable since breakage, damage to insulation or short circuiting was possible thus reducing reliability of the rocket motor; also, in addition to rendering the assembly of the motor time consuming and tedious, the loose twisted wires provided a hazard for producing cracks or fissures in the propellant grains.

One of the objects of the invention is to obviate the foregoing disadvantages through the provision of electrical connecting apparatus which eliminates loose and twisted electrical circuit wires employed in rocket motors of the type referred to.

Another object is to provide a multiple jack type electrical connector, the contact parts of which mate in precise relationship irrespective of tolerances of manufacture in other parts of a rocket motor.

Another object is to provide a multiple jack electrical connector between two relatively movable parts which have various positions of assembly, the parts of the electrical connector always being in the same relative position irrespective of the position of assembly of the movable parts.

Further objects, advantages and salient features will become more apparent from a consideration of the description to follow, the appended claims, and the accompanying drawing, in which:

Figure 1:
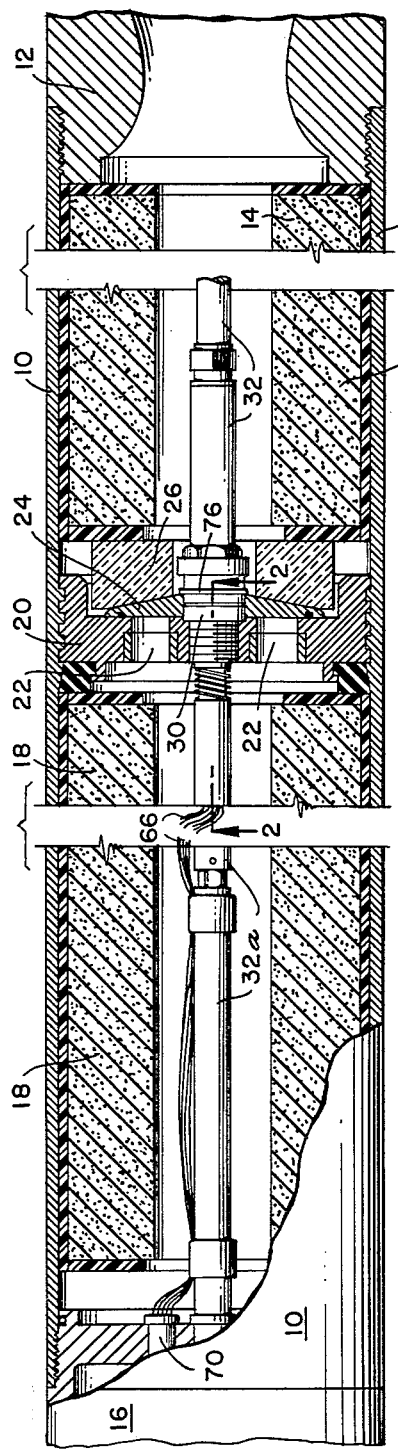
FIG. 1 is a longitudinal central section of a two stage rocket motor with portions broken away, embodying the subject of the invention.

Referring now to the drawing, and first to FIG. 1, tubular rocket motor casing 10 is of conventional construction having a threaded removable rear nozzle 12 which permits loading of rear or first stage rocket grain 14 into the motor. The front end of the motor is provided with a closure 16 which contains certain control apparatus and is similarly threaded to the motor tube to permit insertion of forward second stage or sustainer grain 18. A bulkhead 20 having apertures 22 separates the two motors and communication between the two propellant grain chambers is prevented by plate valve closure 24, retained against the bulkhead by a resilient pad 26 which will be expelled rearwardly when the sustainer grain is ignited. This bulkhead is modified from the conventional to provide a support for certain electrical contact apparatus to now be described.

Bulkhead 20 is provided with a central threaded aperture 28 which receives a plug member 30 which is inserted into place before nozzle 12 is assembled onto the motor tube. It is provided with a rearward projecting tube 32, containing a pressure sensing switch, and an igniter for igniting the rear rocket grain. Since pressure switches and igniters are conventional and form no part of the invention, per se, their details have been omitted in the interests of clarity.

Figure 2:
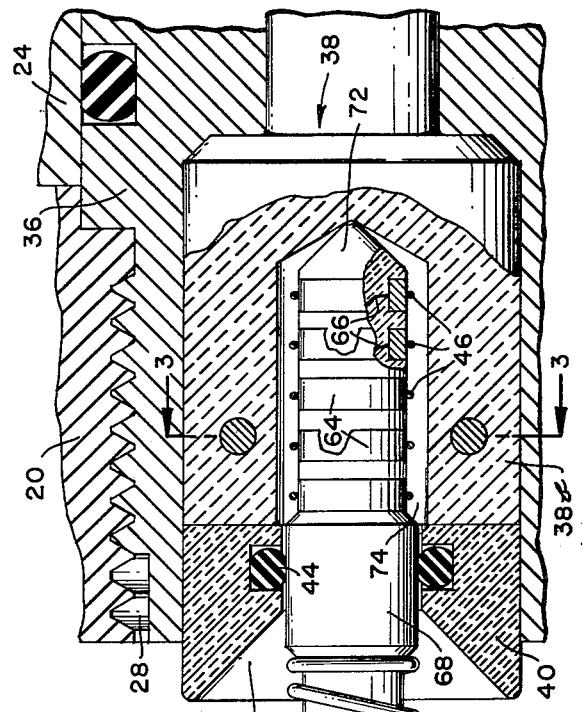
FIG. 2 is an enlarged section taken on line 2—2, FIG. 1, and in the direction of arrow 2, FIG. 3.
Figure 3:
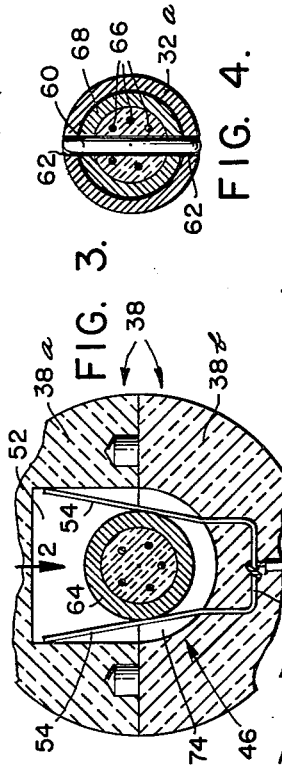
FIG. 3 is a section taken on line 3—3, FIG. 2.
Figure 4:
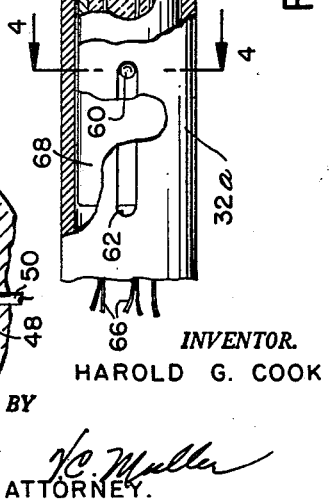
FIG. 4 is a section taken on line 4—4, FIG. 2.

As best shown in FIG. 2, member 30 comprises an outer metallic threaded housing 36, which contains an insert 38 of dielectric material comprising split halves 38a, 38b, which are cemented together after moulding in a suitable die, and an annular end portion 40 which is cemented to the two halves. End portion 40 is provided with a chamfered mouth 42 and an O-ring 44 which prevents entry of foreign matter and volatile gases into cavity 74 formed within split halves 38a, 38b. Member 38b is provided with a plurality of axially spaced U-shaped brushes 46, the bights 48 of the brushes being embedded during the moulding process. Prior to moulding, insulated electrical lead wires 50 are affixed, as by soldering, to each of the brushes. The other half 38a is provided with axially spaced slots 52 which receive the legs 54 of the brushes.

Motor control closure 16 is provided with a projecting tube 32a, having an igniter similar to that contained in tube 32. The rearward end of tube 32a slideably receives a plunger member 56 which is urged rearwardly by a spring 58 and limited in movement in both directions by a pin 60 which slides in elongated slots 62.

The rearward end of member 56 is provided with a plurality of axially spaced metallic slip rings 64 to each of which is affixed one end of a lead wire 66. Member 56 is preferably constructed of insulating plastic material which is injection molded into a mold containing the slip rings and their affixed lead wires together with a metallic tube 68. The rings thus become integrally affixed to member 56 with the lead wires potted in along its length. The lead wires may then be extended through an aperture in tube 32a and electrically connected to terminals on the control closure by a multiple prong plug 70.

The rear terminal end 72 of member 56 is frusto-conical and abuts member 38 to limit its rearward movement under urge of the spring to thus align each of the slip rings in contact with a brush. This conical end also facilitates its entry into cavity 74 by engagement with conical mouth 42 on member 36.

In the assembly of the device, with bulkhead 20 in the position shown, plate 24 is slipped onto member 30, limited in its rearward movement by a shear ring 76. Threaded engagement is then made between the threads on housing 36 and the mating threads in the bulkhead. After being threaded into final position, as shown, communication between the grain chambers is now closed by plate 24. Pad 26, grain 14 and nozzle 12 are next assembled to the position. Grain 18 is next inserted from the front end to the position shown and closure 16, with its projecting tube 32a, is threadedly engaged with the threads at the forward end of tube 10. In event conical end 72 enters mouth 42 with slight misalignment the mouth will guide the former into proper alignment. Prior to the threads on member 16 reaching their final position end 72 will bottom in cavity 74 and further rotation of closure 16 will compress spring 58, member 56, now sliding relative to tube 32a with pin 60 moving in its slot. As will be apparent, when closure 16 is threaded to its final position. Member 56 will be resiliently urged to a predetermined position with slip rings 64 in proper alignment with their mating brush legs 54, irrespective of certain tolerances, such as variations in lengths of tubes 10 and 32a, or tolerances axial fit between closure 16 and tube 10.

In operation, conventional control devices in closure 16 establish circuits to the rear igniter and pressure switch. After the rear grain has been expended and the pressure decreases, the pressure switch in tube 32 senses this change in pressure and a circuit is established to the forward igniter which ignites the sustainer grain. Upon increase in pressure, plate valve closure 24 is forced rearwardly, shearing ring 76, thus opening and permitting gas to flow through apertures 22 and nozzle 12.

Obviously many modifications and variations of the present invention are possible in the light of the above teachings. It is therefore to be understood that within the scope of the appended claims the invention may be practiced otherwise than as specifically described.

What is claimed is:

1. In a rocket of the type having forward and rearward tandem cylindrical chambers containing rocket propulsion grains and a bulkhead between the chambers having a valve closure adapted to be opened after the grain in the rearward chamber has been expended, a propulsion nozzle disposed at the rear end of the rearward chamber, a control closure closing the front end of the forward chamber adapted to be secured to the rocket by rotary motion, and electrical control means within said control closure adapted to be electrically connected to electrically controlled components disposed in the rear chamber, the improvements in combination, comprising; a first member secured to the center of said bulkhead having a plurality of axially spaced brushes, electric lead wires extending from said brushes adapted to be connected to said components, and a second member affixed to and projecting from said control closure axially through the forward chamber having a plurality of slip rings on its rearward end adapted to contact with said brushes, the construction and arrangement being such that when said control closure is rotated to affix it to the rocket, said slip rings rotate and translate toward their mating positions with heir respective brushes, and electrical leads at least partially within said second member connecting the slip rings with control apparatus within said control closure.

2. Apparatus in accordance with claim 1 wherein said first member threadedly engages said bulkhead.

3. Apparatus in accordance with claim 2 wherein said valve closure comprises a plate slideably carried by said first member, and shearable means on said first member adapted to be sheared by said plate to permit the latter to move to open position when the grain in the forward chamber is ignited.

4. Apparatus in accordance with claim 2 wherein said first member comprises a metallic housing threadedly engaging said bulkhead, a dielectric material contained within said housing having a central cavity, said brushes having portions embedded in said material and other portions projecting into said central cavity.

5. Apparatus in accordance with claim 4 wherein said brushes are U-shaped, the bights of which are embedded in said material and the legs are disposed within said central cavity.

6. Apparatus in accordance with claim 1 wherein said second member comprises a first tubular portion affixed to said control closure, and a second portion on which said slip rings are disposed, said second portion being rotatable with said first portion and slideably within same, and resilient means urging said second portion rearwardly away from said first portion.

7. Apparatus in accordance with claim 6 including a pin and slot connector device permitting said second portion to be urged away from said first portion and for rotating said second portion with said first portion.

References Cited in the file of this patent
UNITED STATES PATENTS 2,288,259 Gladulich _____ June 30, 1942
2,877,435 Alvine _____ Mar. 10, 1959